Jan. 19, 1960 D. L. WILKERSON 2,921,649
AIR LINE OILER
Filed April 18, 1957 5 Sheets-Sheet 1
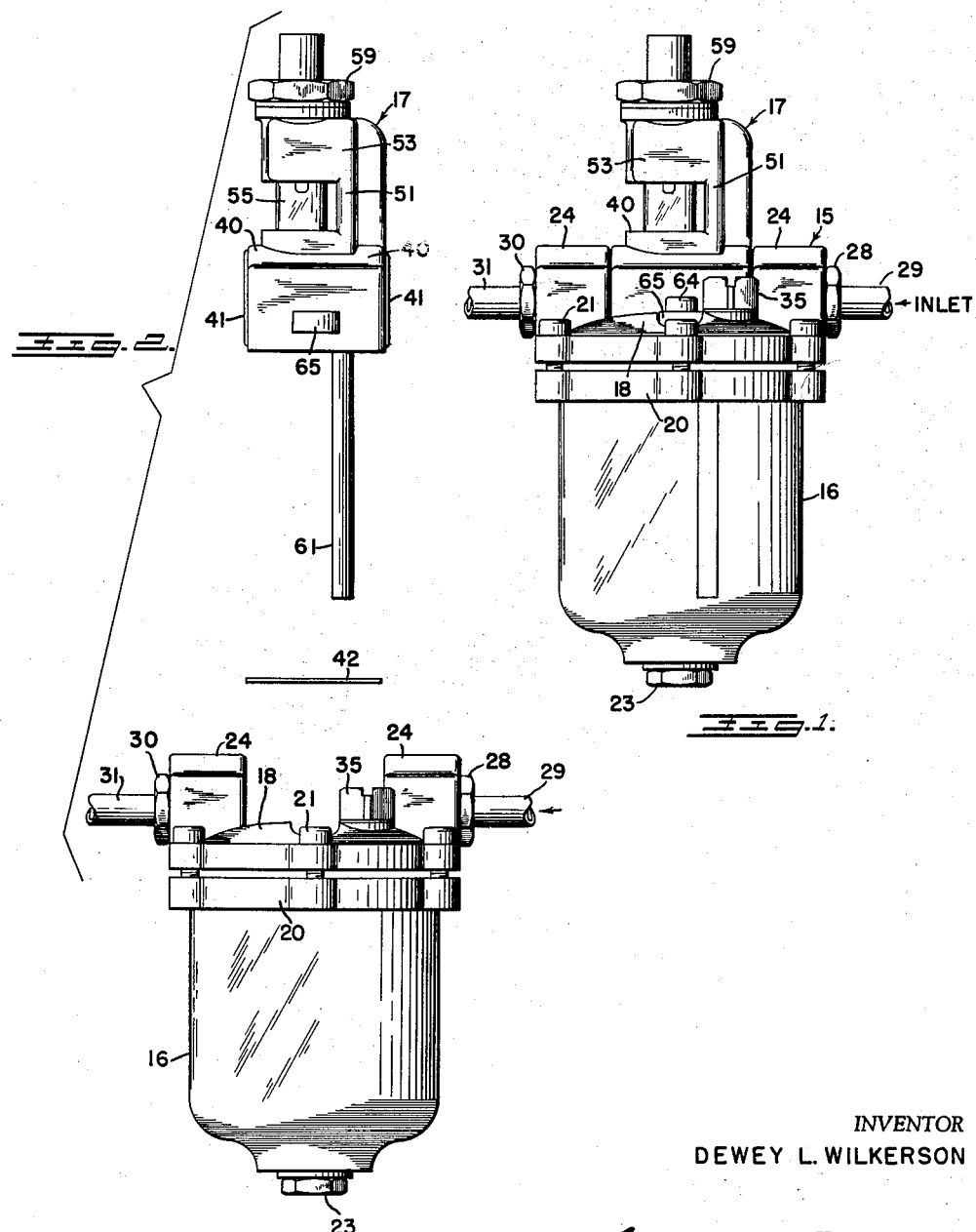
INVENTOR
DEWEY L. WILKERSON
BY Aaron R. Townshend
ATTORNEY

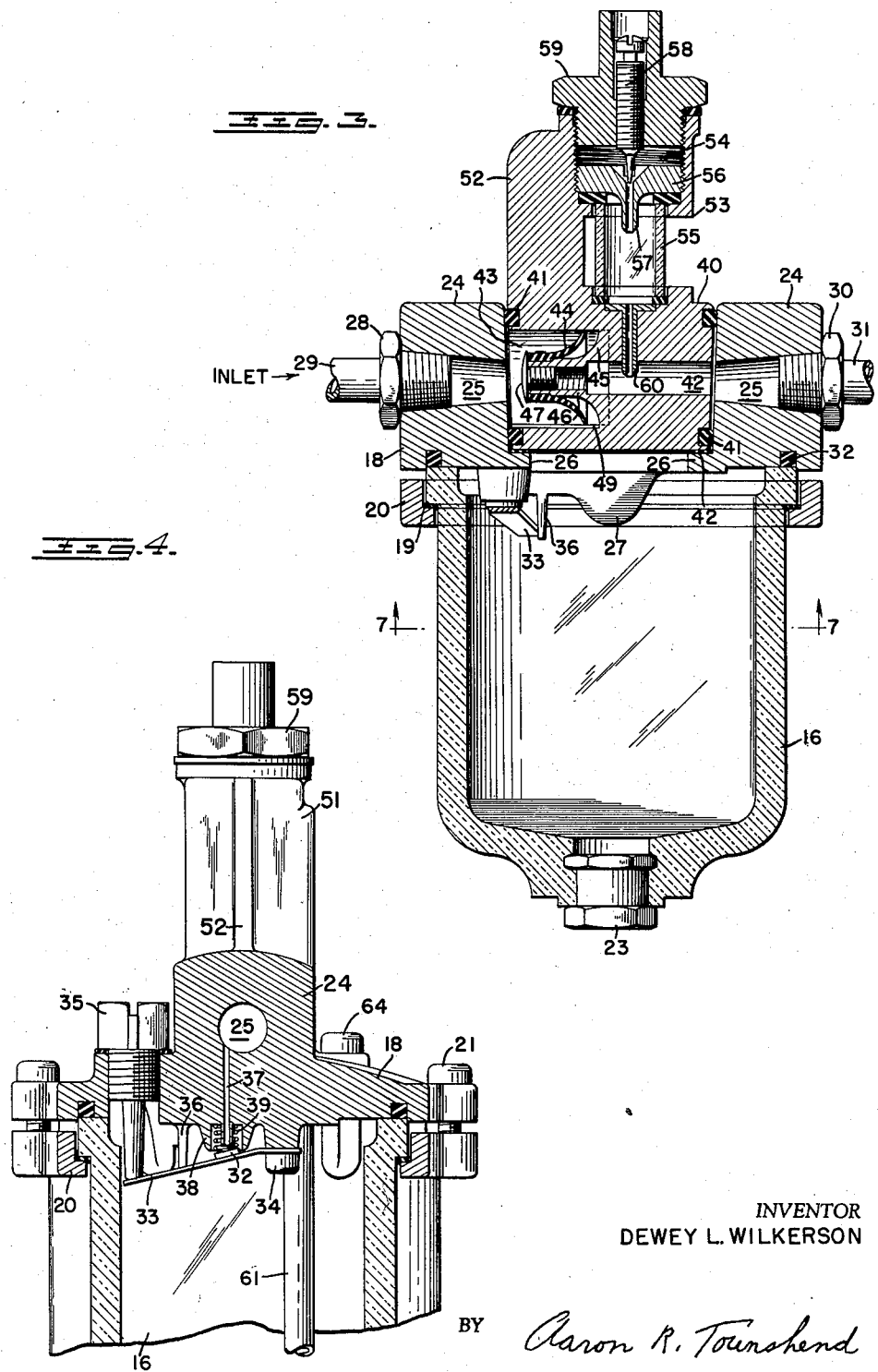

Jan. 19, 1960
D. L. WILKERSON
2,921,649
AIR LINE OILER
Filed April 18, 1957
5 Sheets-Sheet 3
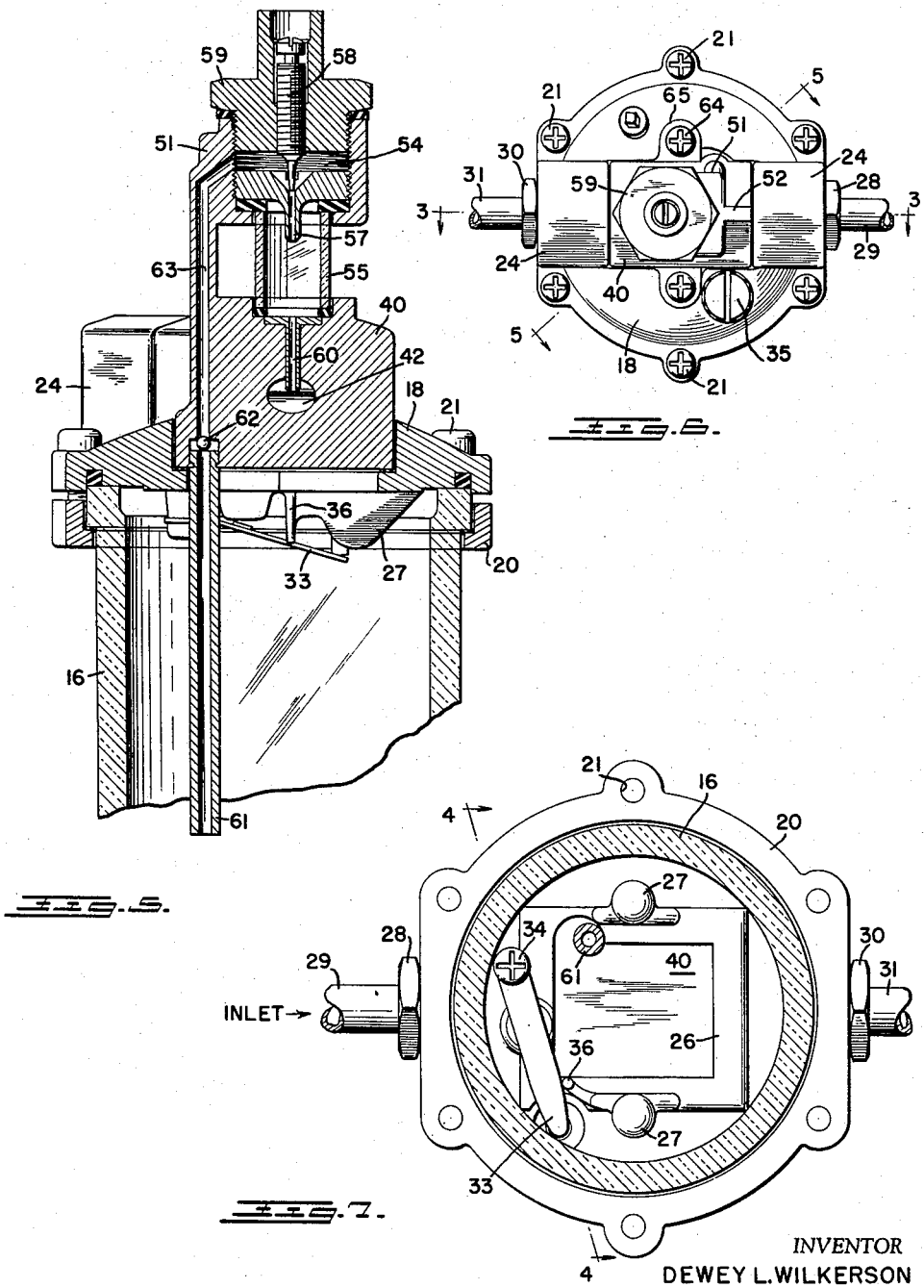
INVENTOR
DEWEY L. WILKERSON
BY Aaron R. Townshend
ATTORNEY

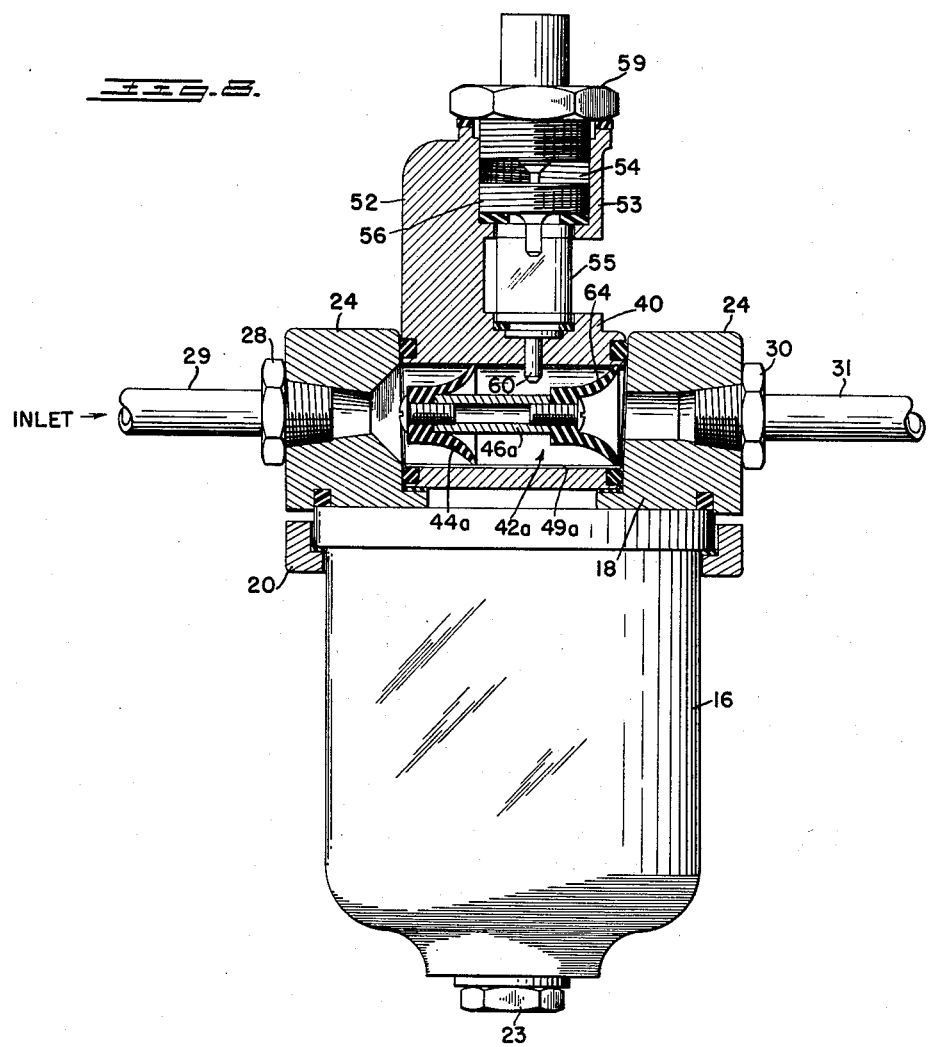

Jan. 19, 1960
D. L. WILKERSON
2,921,649
AIR LINE OILER
Filed April 18, 1957
5 Sheets-Sheet 5
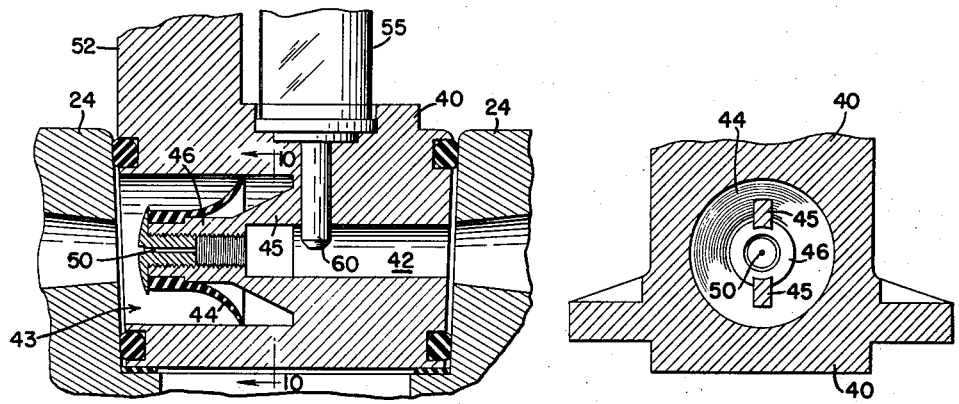
FIG. 9.
FIG. 10.
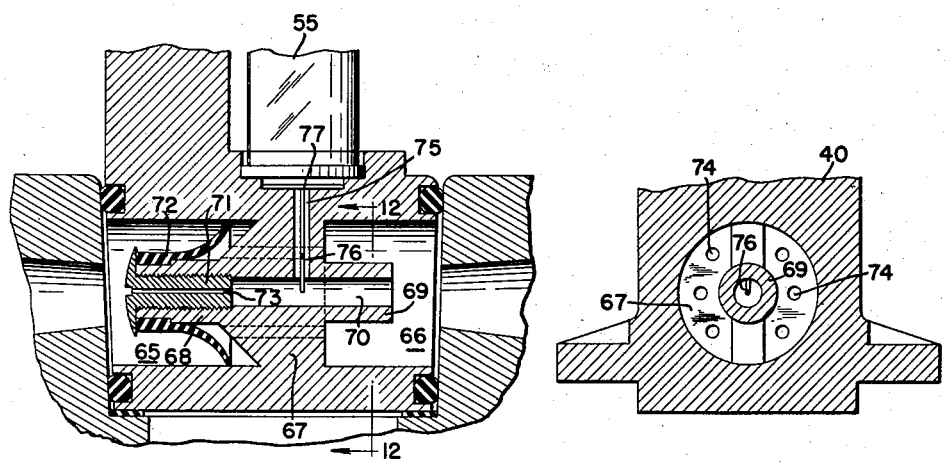
FIG. 11.
FIG. 12.
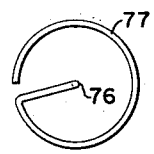
FIG. 13.
INVENTOR
DEWEY L. WILKERSON
BY Aaron R. Townshend
ATTORNEY

United States Patent Office 2,921,649
Patented Jan. 19, 1960

2,921,649

AIR LINE OILER

Dewey L. Wilkerson, Denver, Colo., assignor to Wilkerson Corporation, Englewood, Colo., a corporation of Colorado Application April 18, 1957, Serial No. 653,564

7 Claims. (Cl. 184—55)

The present invention relates to the art of lubrication and particularly to lubricators for compressed air lines. It is customary in the art to supply a lubricant to pneumatic tools and the like by entraining it in the compressed air that provides the motive power. Such entrainment is effected in a lubricator interposed in the air line between the source of compressed air and the tool or other device to be lubricated. These lubricators are usually made in different sizes because different size air operated tools require different amounts of lubrication; so that it becomes necessary to change the lubricator when different size tools are to be used. Each change entails a shut down of operations while being made. Also, when a lubricator has to be cleaned or otherwise serviced additional shut down time is required. The usual shut down time for servicing is a half hour or more. Besides the need for different sizes of lubricators a change from high to low c.f.m. air flow, or vice versa, necessitates the use of a lubricator of a different type.

An object of the present invention is to provide an air line lubricator in which all the operating mechanism is built into an easily removable insert that is interchangeable with other inserts for quick replacement without disturbing pipe connections, and which reduces shut down time to about three minutes as compared to the usual shut down time of thirty minutes or more heretofore required.

Another object is to provide an air line lubricator having flow control means operative automatically in response to air demand to establish and maintain oil flow on as small amount of air flow as desired, regardless of how small, and which enables the maximum flow expected from the line pipe size without a harmful pressure drop.

Still another object is to provide an air line lubricator having means operative to entrain oil as a fine vapor or mist in air passing therethrough.

Other objects and advantages will become apparent from the following description taken in conjunction with the accompanying drawings, in which:

Fig. 1 is an elevation of the lubricator assembled and installed in a compressed air line;

Fig. 2 is an exploded elevation of the lubricator with the removable insert dissociated from the bowl portion;

Fig. 3 is a sectional view on line 3—3 of Fig. 6;

Fig. 4 is a sectional view substantially on line 4—4 of Fig. 7;

Fig. 5 is a sectional view substantially on line 5—5 of Fig. 6;

Fig. 6 is a top plan view of the assembly shown in Fig. 1;

Fig. 7 is a sectional view on line 7—7 of Fig. 3;

Fig. 8 is a sectional view similar to Fig. 3 but illustrating a vaporizing type of the removable insert;

Fig. 9 is a fragmentary sectional view of a form of removable insert alternative to that of Fig. 3;

Fig. 10 is a sectional view on line 10—10 of Fig. 9;

Fig. 11 is a fragmentary sectional view of another form of removable insert alternative to that of Fig. 3;

Fig. 12 is a sectional view on line 12—12 of Fig. 11;

Fig. 13 is a top plan view of the oil drip member shown in Fig. 11.

The lubricator of the present invention has three principal parts: a body portion 15, a transparent bowl 16 depending therefrom, and a removable insert 17 mounted in the body portion and which incorporates the major elements of the operating mechanism. The body and bowl portions are the same in all embodiments of the invention. The removable inserts and their contained operating mechanism vary.

Each body portion comprises a circular casting 18 that constitutes a cover for the open top of its depending bowl 16. An external annular flange at the top of the bowl seats on a cushioning washer 19 carried by the internal annular flange of a clamp ring 20 that is secured to the body casting by a plurality of bolts 21 threaded in registering radial bosses on the peripheries of the body casting and the clamp ring. A sealing ring 22 mounted in an annular groove in the under face of the body casting bears on the rim of the bowl to effect a tight sealed connection between the body and the bowl when the bolts 21 are manipulated to clamp the bowl flange between the clamp ring and the body casting. The bottom of the bowl has a drain aperture closed by a removable plug 23.

The upper face of the body casting carries a pair of upstanding bosses 24 spaced apart in diametral opposition to receive between them one of the removable and interchangeable inserts. These bosses have bores 25 extending therethrough on an axis common to both. The outer side faces of the bosses lie in vertical planes normal to the axis of their bores 25 but their inner faces lie in planes that are slightly divergent upwardly and outwardly. Some material of the body casting between the inner faces of the bosses 24 is removed, leaving a small insert seating ledge 26 extending a short distance inwardly at the bottom of the bosses below the bores 25. As shown best in Fig. 7, the ledge 26 is rectangular and defines the sides of a square opening vertically through the center of the body casting. A pair of bosses 27 depends from the under face of the body casting in diametral opposition and rotated ninety degrees relative to the upper face bosses 24. These depending bosses 27 have thread-tapped sockets opening to the upper face of the body casting to receive attaching screws, later described, headed on a removable insert. One of the upper face bosses 24 has a coupling connection 28 with the upstream pipe 29 of a compressed air line and the other boss has a similar coupling connection 30 with the downstream pipe 31 of the line.

The body casting is further provided with manually adjustable valve means to regulate air pressure within the oil supply bowl 16. This valve means, best shown in Fig. 4, comprises a valve disc 32 of resilient sealing material such as rubber or the like fixed on the upper face of a relatively stiff leaf spring 33. Spring strip 33 is anchored at its inner end to a boss 34 that depends from the under face of the body casting. At its outer end the strip bears against and is flexed downwardly by the tip of an adjusting screw 35 threaded in the body casting at one side of the removable insert and adjacent the upstream pipe connection boss 24. A guide pin 36 depends from the under face of the body casting alongside the spring strip 33 and holds the strip against dislodgment in one direction from the tip of the valve adjusting screw 35. The wall of the bowl prevents dislodgment in the opposite direction. Valve disc 32 is disposed directly beneath the open lower end extension of a small bore air passage 37 which opens at its upper end into the bore 25 of the air inlet or upstream pipe coupling boss 24. A boss 38 depends from the under face of the body casting and is provided with a socket housing an expansion spring 39 that bears on the face of the valve disc 32 and frees it from sticking to the mouth of the extension of air passage 37 following reopening of the valve after a closure.

In the embodiment of the invention as illustrated in Figs. 1–7, 9 and 10, the removable insert, designated generally by the numeral 17, comprises a plug-like member 40 dimensioned to be inserted vertically from the top to fill the space between the body casting bosses 24, and having a flat bottom that seats on the ledge 26 and completely covers the opening in the body casting circumscribed by the ledge. Those faces of member 40 which abut the divergent inner faces of the bosses 24 are complementally inclined in such manner that sealing rings 41 which they carry adjacent their outer margins are wedged in tight sealing relation between the abutting faces when the member 40 is forced down against its seat on the ledge 26. A sealing gasket 42 between the top face of the ledge and the bottom of member 40 provides additional sealing means which, in conjunction with the rings 41, insures that when the insert is fully seated it provides an air tight closure for the opening circumscribed by ledge 26 at the top of the bowl.

The insert member 40 is formed with an air flow bore 42 extending entirely therethrough on the axis of the air inlet and outlet bores 25 with which it is in open communication at each end. Extending inwardly from its upstream or air inlet end the bore 42 is radially enlarged for almost half its length to provide a cylindrical chamber 43 that houses an automatic air flow restrictor baffle 44. This restrictor baffle is a bell-shaped member of rubber or the like having a thin wall that tapers in reduced thickness from an internal annular securing bead on its small end to the rim of its flared mouth. As best seen in Figs. 9 and 10 the baffle is carried by a vertical web 45 that is an integral part of the member 40 and which projects axially into the chamber 43 from its inner end wall. The outer end of the web is formed as a tubular stem 46 having an internally threaded bore extending therethrough on the axis of the air flow bore 42. An attaching screw having a radially enlarged head 47 is threaded into the outer end of the stem bore with its head bearing on the bead of the restrictor baffle and clamping it against a shoulder on the stem, whereby the baffle is detachably secured on the stem with the flare of the baffle directed toward and spaced outwardly from the inner end wall of the chamber 43. When the baffle 44 is mounted in service position as shown its rim is in full line contact with the wall of the chamber 43 under a light tension sufficient to maintain it in contact with the chamber wall in the absence of air demand at the outlet or down stream end of the air flow bore 42.

The thin wall of the restrictor baffle 44 is extremely sensitive to air flow, and for that reason a bleeder is provided to compensate for slow leaks down stream. The bleeder may consist of a shallow axial groove 49 in the wall of the chamber 43 as shown in Fig. 3, or it may be a bleeder bore 50 extending axially through the restrictor baffle attaching screw as shown in Fig. 9, or a combination of both.

The insert member 40 has an integral upstanding post 51 vertically above the flow restrictor baffle chamber 43 and strengthened with a reinforcing web 52. An enlarged head 53 on the upper end of the post provides a cylindrical, internally threaded oil feed chamber 54. The bottom wall of the feed chamber is apertured to receive the upper end of a sight tube 55 of suitable transparent material which seats at its lower end on a sealing gasket mounted in a socket in the upper face of the member 40. The sight tube is held firmly in place by a lock screw 56 threaded in the oil feed chamber and bearing on a sealing gasket seated on the bottom wall of the chamber and the upper end edge of the sight tube. The lock screw has a depending axial nozzle 57 that extends down into the sight tube to a point of easy visibility. An axial bore entirely through the lock screw and nozzle opens at its upper end into a conical depression in the upper face of the lock screw, which depression is the seat for the needle tip of a metering valve plug 58 that has manually adjustable threaded engagement in the open ended axial bore of a closure plug 59 having threaded engagement in the upper end of the oil feed chamber.

A tubular oil delivery jet 60 is detachably mounted in a receiving bore provided in the insert member 40 between the bottom of the socket which houses the lower end of the sight tube and the roof of the air flow bore 42 substantially midway of its length. This jet has at its upper end a flat disc head that seats on the bottom of the sight tube socket with its peripheral margin underlying and contacting the sealing gasket at the lower end of the sight tube. By this arrangement, a fluid tight seal is provided for the head of the jet 60 relative to its housing socket and also for the lower end of the sight tube when the lock screw 56 is tightened down against the sealing gasket at the upper end of the sight tube. The oil delivery jet 60 has a small diameter through bore on the axis of the bore in the lock screw nozzle 57, and the lower end of the jet projects down into the air flow bore 42 substantially to the horizontal plane of the air flow bore axis.

Oil from the supply bowl 16 is conveyed to the oil feed chamber 54 through a vertical siphon tube 61 housed within the bowl and depending from the insert member 40. The upper end of the tube 61 is appropriately secured in a receiving socket in the under face of the insert member and which houses a ball check valve 62 seating on the tube end. A conduit passage 63 provided in the post 51 opens at its lower end into the top of the check valve socket and at its upper end into the oil feed chamber 54 above the lock screw 56.

In all embodiments of the invention the removable insert, designated generally as 17 in Figs. 1 and 2, is secured in place by a simple means consisting merely of two attaching screws 64 headed in lugs 65 extending from opposite sides of the insert member and threaded into the previously mentioned sockets in the depending bosses 27 of the main body casting. As these screws 64 are tightened home the insert member is forced down onto the seating ledge 26 of the body casting in wedged relation between the inner faces of the body casting bosses 24, compressing the seal rings 41 and the sealing gasket 42 and providing a fluid tight seal at those points.

Operation of the lubricator as shown in Figs. 1–7, 9 and 10 is as follows: With the parts in assembled position, reference being made particularly to Figs. 3, 4 and 5, when there is no air demand downstream air pressure is the same at both the inlet 29 and the outlet 31. Equalization of pressure is effected by the free passage of air from inlet to outlet through the air flow bore 42, by way of the bleeder groove 49 of Fig. 3, or the bleeder bore 50 in the control baffle mounting screw of Fig. 9. Air pressure in the oil supply bowl 16 is the same as the air pressure at the inlet by reason of the air passage 37 leading from the inlet bore 25 to the top of the bowl. Upon the occurrence of a service demand of air downstream from the lubricator there is an immediate slight pressure drop at the outlet due to the slight resistance to air flow afforded by the restrictor baffle 44. This decrease of pressure is effective behind or downstream of the baffle in the inner end of the baffle chamber 43, in the air flow bore 42, and through the delivery jet 60, the sight tube 55, metering valve nozzle 57, oil feed chamber 54, conduit 63 and the siphon tube 61 in the supply bowl. The higher inlet pressure transmitted by way of the passage 37 onto the surface of oil in the supply bowl immediately forces oil up through the tube 61 and conduit 63 into the oil feed chamber 54, where it collects and flows past the metering valve and through the nozzle 57 to the head of the oil delivery jet 60. Oil collecting in the bottom of the sight tube on the head of the delivery jet 60 flows down through the jet bore and enters the air flow bore 42 in a thin thread-like stream.

Air pressure in the bowl 16 is regulated by manipulation of the adjusting screw 35 to vary the spacing of valve disc 32 from the mouth of the extension of the air passage 37, whereby to regulate the rate at which oil is transferred from the supply bowl to the oil feed chamber. Under all conditions of operation in response to air demand the air pressure on the surface of oil in the bowl is higher than the air pressure existing in the air flow bore 42 at the outlet of the oil delivery jet 60; so that oil is continuously delivered into the service air stream while air demand exists downstream from the lubricator.

The automatic air flow restrictor baffle 44 flexes radially inwardly at its flared mouth in response to the pressure of air at the inlet side of the baffle in the chamber 43, and moves away from the chamber wall under tension to allow air to pass to the inner end of the chamber and into the bore 42 for uninterrupted flow from the inlet 29 to the outlet 31. During its passage through the bore 42 the air picks up and entrains oil being delivered into the air stream by the jet 60. The degree of radial constriction of the baffle 44 is dependent upon the magnitude of the service air demand; so that it functions on any flow whatever and so restricts the air flow that the pressure of air on the surface of oil in the bowl 16 is effective to force oil to the feed chamber 54 during the entire period that air is flowing through the bore 42 in response to service demand, regardless of the c.f.m. of the air flow.

Fig. 8 illustrates an oil atomizer type of removable insert. Except for a change in size of the air flow bore and the addition of another restrictor baffle this form of insert is the same as that shown in Fig. 3 and, for the sake of brevity, identical parts in the two figures are designated by the same reference characters. In this form of insert the diameter of the air flow bore 42a is substantially the diameter of the chamber 43 in Fig. 3 and is uniform from end to end. The wall of the bore has a bleeder groove 49a extending full length thereof. A restrictor baffle 44a identical to baffle 44 of Fig. 3 is similarly secured to the upstream end of a tubular mounting stem 46a on a horizontal web, not seen, corresponding to the web 45 in Fig. 3. A second and identical restrictor baffle 64 is similarly secured to the downstream end of the mounting stem 46a with the rim of the baffle engaged against the wall of the bore in a plane normal to its axis and spaced slightly inwardly from the outlet end of the bore.

Operation of the assembly shown in Fig. 8 is the same as operation of the assembly shown in Fig. 3, with the added advantage that the second baffle 64 being on the downstream side of the oil delivery jet 60 acts to break up and atomize the air-entrained oil so that it passes to the outlet as a fog or vapor so fine that it will float in still air for several minutes.

Figs. 11–13 illustrate details of another form of removable insert. This form is substantially similar to the form shown in Figs. 9 and 10, and identical parts in the various figures are designated by the same reference characters. In this form of insert the air flow bore comprises an inlet chamber 65 corresponding in depth and diameter to the chamber 43 in Fig. 9 and a similar outlet chamber 66. The inner end wall of each chamber is constituted by an annular web 67 normal to the axis of the chambers and separating the two. A tubular stem 68 extends axially from the center of the web into the inlet chamber 65 and a similar stem 69 extends axially from the center of the web into the outlet chamber 66. Both stems terminate inwardly from the open end of their respective chambers. An open ended bore 70 extends entirely through the stems and web and is threaded at its upstream end to receive an attaching screw 71 for a restrictor baffle 72 that is identical to the baffle 44 of Fig. 9 and similarly mounted. An air passage bore 73 extends axially through the shank of the screw from end to end. A plurality of air passages 74 extend axially through the web 67 in a circle concentric to the bore 70 and cooperate with the bore to establish air flow communication between the chambers 65 and 66.

Also in this form of insert an oil delivery passage 75 extends from the center of the socket housing the lower end of the sight tube 16 to the roof of the bore 70. This passage houses a drip wire 76 that extends at its lower end part way into the bore 70. Wire 76 is a single length bent at its upper end in a flat coil 77 that provides a head for seating on the bottom of the sight tube socket. Oil in the passage 75 collects on the wire 76 in a film and drips into the air stream passing through the bore 70. It is intended that this drip wire 76—77 may be used in place of a jet 60 if desired; also, that an appropriately dimensioned jet may be used in the passage 75 in place of the drip wire.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In an air line lubricator having a cylindrical air flow bore with an oil inlet intermediate its ends; an automatic air flow restrictor comprising a substantially bell-shaped baffle of resilient material bearing at its flared rim against the walls of the bore and normally closing the same in the absence of a pressure differential between opposite ends of the bore, said baffle being upstream of the oil inlet with relation to the direction of air flow and with its flared rim downstream with relation to the direction of air flow, a support in the air flow bore adjacent the oil inlet, an axial stem on the support projecting upstream thereof with relation to the direction of air flow, said baffle mounted on the stem, said stem and the support having an air flow passage axially therethrough in open communication with said air flow bore, and an attaching screw threaded in the upstream end of the stem air passage and securing said baffle on the stem.

2. In the structure of claim 1, said attaching screw having an axial air bleeder bore extending entirely therethrough.

3. In the structure of claim 1, said support comprising a partition entirely across the air flow bore adjacent the oil inlet, an air bleeder bore axially through the attaching screw, and at least one air passage through the partition radially outward from its axial air flow passage.

4. In an air line lubricator having a cylindrical air flow bore with an oil inlet intermediate its ends; an automatic air flow restrictor comprising a substantially bell-shaped baffle of resilient material bearing at its flared rim against the walls of the bore and normally closing the same in the absence of a pressure differential between opposite ends of the bore, said baffle being upstream of the oil inlet with relation to the direction of air flow and with its flared rim downstream with relation to the direction of air flow, and an air bleeder groove in the wall of said cylindrical air flow bore and bypassing said baffle.

5. In an air line lubricator having a cylindrical air flow bore with an oil inlet intermediate its ends; an automatic air flow restrictor comprising a substantially bell-shaped baffle of resilient material bearing at its flared rim against the walls of the bore and normally closing the same in the absence of a pressure differential between opposite ends of the bore, said baffle being upstream of the oil inlet with relation to the direction of air flow and with its flared rim downstream with relation to the direction of air flow, a second, similiarly arranged baffle in the air flow bore downstream of the oil inlet with relation to the direction of air flow, and an air bleeder groove in the wall of said cylindrical air flow bore and bypassing both said baffles.

6. In an air line lubricator having a cylindrical air flow bore with an oil inlet intermediate its ends; an automatic air flow restrictor comprising a substantially bell-shaped baffle of resilient material bearing at its flared rim against the walls of the bore and normally closing the same in the absence of a pressure differential between opposite ends of the bore, said baffle being upstream of the oil inlet with relation to the direction of air flow and with its flared rim downstream with relation to the direction of air flow, a support in the air flow bore adjacent the oil inlet, an axial stem on the support projecting upstream thereof with relation to the direction of air flow, said baffle mounted on the stem, said stem and the support having an air flow passage axially therethrough in open communication with said air flow bore.

7. An air line lubricator comprising; an oil supply bowl, a cover therefor having a central area opening therethrough and provided with an air inlet at one side of the opening, an air outlet at another side of the opening, and an air passage from the air inlet to the top interior of the bowl; a member insertible in the cover opening in detachable engagement with the cover and completely closing the opening; said member having an air flow bore therethrough for communication at one end with said air inlet and at its other end with said air outlet; said insertible member having a self-contained oil transfer system between the lower interior of the bowl and the air flow bore intermediate its ends; and air flow restriction means in the air flow bore adjacent its air inlet end, said restriction means being operatively responsive to air pressure decrease in the outlet end of the air flow bore to pass air in volumetric proportion to the pressure decrease and comprising a substantially bell-shaped baffle of resilient material bearing at its flared rim against the walls of the bore and normally closing the same in the absence of a pressure differential between opposite ends of the bore, said baffle being upstream of the oil inlet with relation to the direction of air flow and with its flared rim downstream with relation to the direction of air flow, a support in the air flow bore adjacent the oil inlet, an axial stem on the support projecting upstream thereof with relation to the direction of air flow, said baffle mounted on the stem, said stem and the support having an air flow passage axially therethrough in open communication with said air flow bore.

References Cited in the file of this patent

UNITED STATES PATENTS

| | | |
|---|---|---|
| 1,751,714 | Peters | Mar. 25, 1930 |
| 2,223,700 | Norgren | Dec. 3, 1940 |
| 2,442,777 | Norgren | June 8, 1948 |
| 2,535,756 | Ronceray | Dec. 26, 1950 |
| 2,576,669 | Bramhall | Nov. 27, 1951 |
| 2,626,016 | Kiefer | Jan. 20, 1953 |
| 2,626,820 | Dons | Jan. 27, 1953 |

FOREIGN PATENTS

| | | |
|---|---|---|
| 2,643 | Great Britain | July 2, 1878 |